2,725,314
Patented Nov. 29, 1955

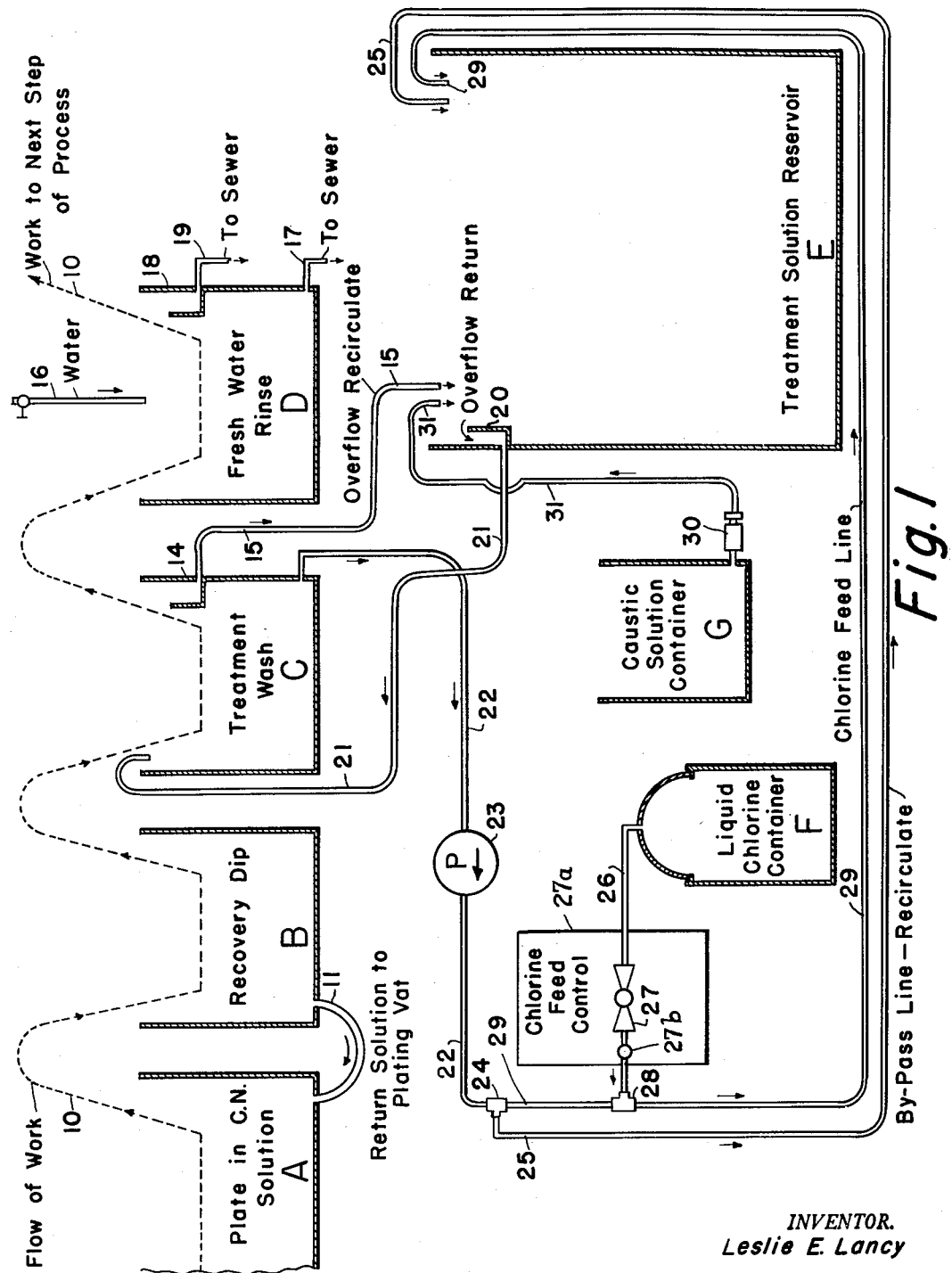

2,725,314
IN LINE TREATMENT OF TOXIC CARRY-OVER OF WORK PIECES

Leslie E. Lancy, Ellwood City, Allegheny County, Pa.

Application January 29, 1952, Serial No. 268,889

16 Claims. (Cl. 134—13)

This invention relates to a new and improved system or method of conditioning and handling toxic wastes such as are produced in the chemical treatment of work lengths or pieces and particularly, to the direct conditioning of toxic waste carry-over on a metal surface that has been subjected to a continuous-line chemical treatment or processing.

The system of my invention is employed as an integrated part of a work length or piece processing line, either as an intermediate treatment or as a final treatment, depending upon the type of processing being effected.

From an economy standpoint as well as from the standpoint of the enforcement of laws relating to the prevention of stream pollution, the problem of treating processing wastes such as due to electro-plating, pickling and other surface treatments of work pieces has become a major problem and particularly so, in the plating industry. A new or re-located industry may not under the present law, be permitted to commence operations until its waste disposal plant has been completed and accepted by enforcement authorities. As a consultant in the electro-treatment field, I have been drawn into the field of waste disposal particularly from the standpoint of the problem as presented to small or medium size business establishments, many of which were on the point of being put out of business if they were not able to comply with waste regulations within a reasonable time. My study and work in this particular field disclosed that disposal installations based upon known and used systems are so expensive in installation and use that a medium sized or small concern would strangle itself under the tremendous overhead cost or amortization required. I found that the problem was not limited to small size plants solely, but that it was one of general application in the field, of course having a corresponding greater importance to smaller installations. A waste treatment plant heretofore required an average investment of about 5 to 10 times greater than, for example, the production planting installation, itself, whether the installation was a part of a business establishment or was a proportionate portion of its investment in equipment of a municipal sewage disposal plant.

I found that the problem centered about rinse waters carrying different kinds and quantities of toxic materials or salts and that it was essentially complicated, due to the large quantity of water normally consumed for rinse purposes. For example, the water consumption in a small to average size plant ordinarily runs from 10,000 to 100,000 gallons for each eight hour work day. Even with wastes segregated for specific treatment purposes, an average tank capacity of 10,000 to 40,000 gallons is needed for holding, treating and settling of each toxic group.

In accordance with prior accepted procedure in this particular field, it has been customary to rinse off a work piece as it comes from a chemical treatment line with wash water, to collect such contaminated wash water in a holding tank, to provide at least two and in many cases four holding tanks for each line (so that at least one tank is available while the contents of the other are being treated), and to provide an experienced chemist and about six laborers (one for each shift) for each line to periodically test the toxic content and percentage concentration in each filled holding tank. The procedure involves a series of progressive chemical testing and treating steps for removing the toxicity of the rinse water before the content of the holding tanks may be emptied into the sewer. In this connection, the testing had to be accurate, a large body of water had to be treated, and the chemicals added had to be accurately supplied. It will be apparent that the waste of labor and water and chemicals was very great.

My further investigations disclosed that those skilled in this particular art felt, in spite of the expense involved, that such a system was the only practical one that could be employed and that any saving to be made necessarily had to be a saving of materials used, in the equipment, in the efficiency of the manpower used, or in the type of chemicals used in the treatment of the contaminated rinse water. It was felt that the use of rinse water to remove toxic materials from work pieces was a necessary adjunct of the process. In fact, after the development of my new system, those skilled in the art were still skeptical, until I definitely showed by practical installations that rinse water washing of toxic materials could actually be eliminated and that a direct treatment of the toxic carry-over could be effected in a continuous manner directly upon the work piece without damage to its surface, or to its appearance or functional qualities, and without interrupting an in-line processing of the work length or piece. I have been able to fully comply with requirements as to appearance or functional qualities of the work piece, e. g. so that it retains its corrosion resistance, its adhesiveness to further plating or its effectiveness for further processing, and retains its brightness, etc.

In arriving at my solution, I made an entirely new approach to the problem which was directly contrary, to prior teachings and ideas in this field. In arriving at such solution, I found that there were a number of important factors involved and that these factors could be successfully met to provide an installation whose out-lay of equipment would be about 1% of the cost of a conventional waste treatment installation, with further savings in operative costs, in chemicals, etc.

It has been an object of my invention to provide a solution to the problem heretofore presented in the treatment of industrial toxic wastes;

Another object has been to provide a new and improved system or process for carrying out an effective treatment of toxic carry-over on work lengths or pieces;

A further object has been to provide a treatment system or process for toxic wastes which will materially lessen the cost of the initial installation as well as maintenance and utilization costs;

These and many other objects of my invention will appear to those skilled in the art from the description of my invention.

In the drawings, Figure 1 is a somewhat diagrammatic lay-out illustrating an exemplary integrated line treatment system employed and arranged in accordance with the principles of my invention and as applied particularly to the removal of cyanide toxic waste.

I have been able to, for the first time, devise a system which has departed from the prior principles of those skilled in the art, but which is fully effective, which makes possible an in-line operation, and which greatly simplifies the treatment of toxic solutions or substances. My system may be termed an "in line integrated circulating toxicity-eliminating system" in which a work piece or pieces (metal strip or individual articles) carrying-over toxic waste or material from previous processing is directly subjected to a treatment solution, such that the toxic material is rendered non-toxic or innocuous without damage to the work piece and without adversely effecting a subsequent processing of it, such that wash water used is not rendered toxic, such that the treatment solution may be used, re-used and renewed without interruption of a continuous in-line movement of work pieces, and such that the use of large holding tanks for collecting treating contaminated wash water is no longer necessary.

Briefly summarized, I discovered, contrary to previous precepts, that it was not only possible to directly treat toxic material as carried-over on the surface of a work piece by directly applying a treatment solution to the surface of the work piece, but that it was highly advantageous to do so, and that important factors involved in waste treatment could be effectively met. Although the chemicals used in my process are applied directly to the surface of the work, contrary to the beliefs of those skilled in the art, I have been able to do so without damage to the work piece and without interrupting its in-line movement. I can use and re-use and constantly enrich the treating solution without interrupting the in-line processing of a work piece and greatly simplify and minimize the chemical controls.

I determined, however, that an important factor had to be met to successfully carry out such a process, namely that the treatment solution should be capable of acting quickly and substantially instantaneously upon the toxic carry-over, without damage to the physical and functional qualities of the work piece. In other words, the treatment has to be carried out in such a manner as to avoid a subsequent carry-over of effective amounts of toxic chemicals after the treatment has been accomplished, and such that wash water subsequently applied to the work piece can be employed merely to cleanse the surfaces of the work piece from innocuous salts or chemicals (non-toxic carry-over), so that the wash water, without further treatment, can then be directly discharged into the sewer. I was able to meet this factor by supplying a constantly effective treatment solution directly to surfaces of the work piece, i. e., a recirculating solution enriched, for example, at one-half hour periods; by providing a treatment solution having an excess of the chemicals which were anticipated to be reacted or destroyed in carrying out the treatment, and by utilizing an aqueous solution of the treatment chemicals which is in excess of the quantity of water necessary to carry the chemicals in solution. Care is taken to avoid using chemicals in more than a slight excess in this solution such that unreacted quantities will not be toxic from the standpoint of a subsequent work piece carry-over.

In addition, I determined that a wetting agent, namely a non-foaming agent such as di-ethylhexanol, could be effectively and economically employed in the treatment solution to facilitate reaching the surfaces of the metal work pieces, to thoroughly rinse them, and speed up and facilitate the chemical neutralizing reactions involved.

By way of example, a single 500 to 2000 gallon solution treatment tank or reservoir (a 1,000 gallon tank is usually sufficient) was found satisfactory for my system as compared to a group of 10,000 to 100,000 gallon toxic hold tanks heretofore required in prior systems. Control or testing of the treatment solution is now a simple matter, as the color of the solution, a color comparator test, the use of pH paper or test papers, etc. will indicate if the solution is in proper working order. Sludge or precipitates may be continuously removed from the reservoir to make possible the use of the same treatment solution for extensively long periods, but even if it is not removed, I have found that the solution can be employed, from a practical standpoint, for a period of two months or more.

The direct treatment of the toxic carry-over can be accomplished by single and two-step, in line operations, depending upon the nature of the toxic substances. For example, as an optimum, I employ a single step treatment for CN carry-over and a two-step method for chromic acid carry-over. In any event, I employ a substantially continuous, in-line, integrated treatment based on the use of circulated and renewed treatment solution which involves a relatively small quantity of re-used water and a limited amount of chemicals and which eliminates toxic contamination of large quantities of wash water with the need to collect and treat wash water (may require a two hour or longer holding period) before it is discharged into the sewer. In accordance with my procedure, the work article is quickly treated as it moves in line and may then be washed in line, without interrupting its movement, and without imparting toxicity to the wash water.

In this connection, I have found that employing my system, the saving of treatment chemicals within one year frequently will amortize the full cost of its installation.

Of the toxic solutions and substances, cyanides are one of the major offenders. The usual disposal requirements are to reduce the cyanide content of the waste to zero which is equivalent to lowering the concentration to a value less than the sensitivity of the controlling laboratory method used to detect it (of prior procedure), since this threshold value may be less than 0.1 p. p. m. Such a type of waste is common in connection with copper, brass, cadmium, zinc and alloy plating solutions. Although the broader phase of my invention is not limited to particular treatment chemicals, I will, for the purpose of illustration, set forth a practical chlorination (oxidation) method which utilizes a caustic (alkali metal hydroxide such as NaOH and in solution form). Assuming an average drag-out rate of cyanide of 10 grams per minute, the CN would normally amount to a 125 p. p. m. contamination at a flow rate of 20 gallons per minute of water, with a waste volume of 9600 gallons for an eight hour period. However, employing my process, chlorine in excess of 30 to 50 p. p. m., using a 2000 gallon treatment solution reservoir, constitutes a reserve sufficient for 3 to 5 minutes of operation without renewal, with a maximum excess for about 15 minutes of operation (to avoid toxic carry-over). Normally the renewal should be a continuous process by manually controlling the rate of continuous chlorine flow (see valve 27 of Figure 1) to correspond to the average carry-over of toxic compound. A predetermined excess of chlorine may be thus constantly maintained. In most cases, I have found that dragged-out alkali will take care of maintaining a pH above 8.5 during chlorination, so that no additional alkali (e. g. NaOH) is necessary and in any event, continuous alkali additions are not necessary.

A minimum chlorine excess (factor) of 30 parts per million or 0.03 gram per liter of solution is maintained with a pH of above 8.5 up to about 11. The chlorine and caustic can be renewed without interrupting the work processing. Due to the slow build up of non-toxic precipitates or salts, I first thought that the sludge should be dumped once a week or twice a month, but from actual experience, I have found that a two months period is more than sufficient. It will be apparent that this represents a greater saving in chemicals, since the treatment solution is used over and over again for a long period of time, being renewed with chemicals as needed, periodic checks (two or three times a day), so as to maintain the circulating treatment solution in a proper working condition.

In carrying out a cyanide treatment as outlined above, as exemplified in Figure 1, the following equations of chemical reactions taking place are given:

$$Cl_2 + 2NaOH \rightarrow NaOCl + H_2O \quad (1)$$
$$NaCN + NaOCl \rightarrow CNCl + NaOH \quad (2)$$
$$CNCl + 2NaOH \rightarrow NaCNO + NaCl + H_2O \quad (3)$$
$$2NaCNO + 3NaOCl + H_2O \rightarrow$$
$$2CO_2 + N_2 + 3NaCl + 2NaOH \quad (4)$$

NOTE.—About 7½ lbs. of $Cl_2$ is used per lb. of CN. About 7 lbs. of NaOH is used per lb. of CN.

From the above, it will be apparent that in accordance with my system or process, I provide sufficient treating chemicals to fully and quickly neutralize the toxic carry-over and I maintain a quantity excess such that unreacted chemicals of the solution do not, themselves, constitute a toxic carry-over to the wash water, and employ treatment chemicals of a type and quantity such that they are not deleterious to the work piece. Minimum amount of control is needed to keep the circulated solution enriched. The arrangement is such that the treatment chemicals may be employed at optimum conditions for the process and for avoiding imparting toxicity to the final wash water. The relatively low chemical concentration of the treatment solution also insures that any carry-over of excess chemical to the washing step will be non-toxic.

By way of comparison, old procedure, wherein a 100,000 liter waste water toxic solution is to be treated, would require a .03 gram per liter of chlorine or a total of 3000 grams of chlorine as a minimum with a long holding period of two hours or more. On the other hand, by using a 1000 liter treatment solution of my procedure, I require only 30 grams of chlorine. It is thus apparent that the saving in chemicals is very great. In addition, as previously pointed out, the actual treatment solution need not be discharged and replaced until after about two months of operation, whereas the toxic wash water of the old procedure has to be continuously collected and then treated before it is discharged. I have further eliminated critical controls and analyses, as well as the complicated and time-consuming waste water treatment procedure.

Another important type of waste common in electroplating installations arises from the use of chromium in electropolishing, electroplating, anodizing, passivating, pickling, bright dipping, etc. Sanitary regulations require that the effluent should contain less than 0.5 p. p. m. $Cr^{VI}$, although in some instances two to four times this concentration may be allowed. As an average, the drag-out may be 250 p. p. m. In accordance with the old process, if the rinse water is running at a speed of 5 gallons per minute, the chromic acid to be treated would thus be 5 grams per minute.

In accordance with my process, a three stage integrated chromate waste treatment shows optimum results. In the first and second stages, the reactions serve the purpose of reducing the hexavalent chromium to the trivalent state and is conducted at a pH of about 1.5 to 3.5. The sulphurous acid generated by the sulphur dioxide gas, itself, controls the pH. The third stage involves the precipitation of the chromium and the caustic additions maintain a pH of about 6. Actually, the so-called third stage constitutes the second step after chromium plating; only the trivalent chromium waste dragged out from the first step is precipitated in such third stage. Employing this process, it may be desirable to utilize two tanks (two sub-zones), at zone C (of Figure 1), one tank for the first and second reactions and a second tank for the final reaction. The reactions are as follows:

$$SO_2 + H_2O \rightarrow H_2SO_3 \quad (1)$$
$$3H_2SO_3 + 2CrO_3 \rightarrow Cr_2(SO_4)_3 + 3H_2O \quad (2)$$
$$Cr_2(SO_4)_3 + 6NaOH \rightarrow Cr(OH)_3 + 3Na_2SO_4 \quad (3)$$

Approximately 1 lb. of $SO_2$ is required per lb. of chromic acid ($CrO_3$), and 2½ lbs. of lime.

The precipitated chromic salts may be allowed to settle or may be filtered out as desired, so that the solutions can be used indefinitely with continuous additions of chemicals expended as explained in connection with the cyanide waste treatment.

In the arrangement shown in Figure 1, A illustrates the last treating tank in a work process line, wherein a cyanide solution is employed. The work line 10 may be a continuous strip or a line denoting the travel path of the work in process, racked work such as bumpers, etc. carried on a mechanical conveyor or by hand. Tank B serves as a recovery dip for the cyanide solution which is returned to tank A through line 11. The work line 10 is shown as being given a toxic carry-over treatment wash in tank C and a fresh water rinse in tank D. An overflow 14 which controls the level of the solution in tank C has a line 15 returning solution to a reservoir E. As shown, a liquid chlorine container F and caustic (alkali metal hydroxide) solution container G are provided to renew the solution in the reservoir or tank E. After the work line 10 leaves the treatment tank C, it enters a fresh water rinse tank D which removes any adhering or carried-over non-toxic salts or solution. Water may be continuously supplied to this tank from a source 16 and directly discharged to the sewer through line 17. Since the rinse water is not toxically contaminated it is directly discharged without any treatment. Overflow 18 maintains the level of the solution in tank D and also discharges into the sewer through line 19.

Circulation of treatment solution into the tank C is effected by an inlet or supply line 21 which is connected to an overflow return 20 of the reservoir E; this flow may be a gravity flow or may be replaced or supplemented by employing a suitable solution circulating pump in the line 21, such as 23 of line 22 which may be a motor driven pump having a capacity of about 20 gallons per minute with a 25 foot head.

Chlorine from the liquid container F is supplied by line 26, where it becomes a gas, to feed control valve 27. The chlorine gas flows through connection 28, due to the vacuum syphon mechanism utilized in a chlorinator 27a. As shown, the latter is equipped with a needle type of valve 27. The rate of control may be visually noted or noted by a recorder 27b. Since the chlorinator vacuum system doesn't require as large a quantity of solution flow as is desirable for recirculating purposes, a larger part of the treatment solution (about 15 G. P. M.) bypasses the chlorinator and is pumped by pump 23 along bypass line 25 to the reservoir E. As shown, a chlorine gas feed line 29 is connected from connector 28 to connector 24 and to discharge into the reservoir E. If desired, three-way valves may be substituted for the connections 28 and 24 to provide alternate as well as simultaneous flow of the chlorine through lines 25 and 29 and if desired, to shut off the flow (independently of valve 27). The caustic solution container G for supplementing any caustic carry-over from containers A and B, is shown connected through a reciprocating pump 30 (which may be rated at one gallon per hour) and line 31 to also discharge into the reservoir or supply tank E.

From the above example, it will be apparent that the treatment solution is constantly recirculated and its content constantly renewed, so that the metal work pieces and hanger racks or the metal strip, as the case may be, are given the requisite treatment in tank or zone C to fully neutralize toxic carry-over before the work line 10 enters the wash tank or zone D. As a result, the wash water supplied to the zone D may be continuously supplied and discharged to the sewer without any danger of stream contamination. That is, the used wash water does not contain even minute quantities of toxic carry-over that are biologically lethal. Any solution or salts carried-over to zone D are neutral or innocuous.

The layout of Figure 1 is generally exemplary of typical layouts that may be employed for treating various types of toxic wastes other than cyanide wastes. That is, changes in the type of chemicals and in the number of treatment steps may be made to effect the neutralization or elimination of various types of toxic carry-overs.

A suitable ionic wetting agent, such as of a sulphonated fatty acid type, about 0.001% in the treatment solution, should be supplied to the reservoir E for best efficiency of toxic carry-over treatment in tank or at zone C.

For a longitudinal work-rack carrying chain that advances about 400 racks per hour, or for a corresponding rate of strip movement (about 35 to 70 feet per minute), a 1000 to 2000 gallon reservoir E may be used. Reservoir E may be of 400 to 1000 gallons capacity, when the rate of movement is 80 to 200 racks per hour. A 1000 gallon tank is sufficient up to about 400 racks per hour and a 2000 gallon tank for 400 or more racks per hour. On an average, the work pieces will be subjected to about 30 seconds of treatment at step C. In old procedure, the minimum holding period for treatment of contaminated wash water, as collected in a holding tank, is about one hour with about two hours as prudent practice. The solution provided in the reservoir or supply tank E, does not have to be highly concentrated for effective action. In fact an excess of about .0005 gram of chlorine per liter of solution is all that is necessary, since the chlorine is continuously added at the rate of about 7½ parts of chlorine for each part of cyanide dragged in. However, for a faster chemical reaction and for added safety, a larger chlorine excess is employed, as previously explained, while caustic content is maintained to provide a pH of above 8.5 up to an average of about 11. I have determined that the quickness of the reaction of my system also offsets any tendency of the treating chemicals to adversely affect the surface of the work pieces or strip. As to chlorine treatment, the old wash water treatment had to go to the extreme of employing about 15 parts of chlorine to 1 part of CN in connection with copper plating wastes, with a subsequent necessity of reducing the excess chlorine.

In employing my invention, the work piece or pieces metal strip or individual articles), after or following their treatment in a toxic solution applying zone, are then passed or moved in-line, without interruption, through basically a toxic-waste removing zone that is located following the toxic treatment zone or zones in the path of movement of the work pieces and then, in the same manner and subsequently, are passed through a wash water rinsing or applying zone where non-toxic carry-over is removed from surface portions of such work pieces. Depending upon the type of toxic-waste carry-over, the first or basic (toxic neutralizing) zone C may be made up of two or more in-line sub-zones, as pointed out in connection with the treatment of chromate waste carry-over. The basic treatment zone C has a collecting tank or agency and connecting means 15 and 21 between it and the solution treatment reservoir E (that is located to one side of or above or below the line), so as to return used solution to the reservoir and to supply fully enriched solution from the reservoir to the surface portions of the work articles during their movement through such basic zone. If gravity means is not employed for solution circulation or movement, pumps may be employed for this purpose. The reservoir is provided with connections for circulating and enriching its solution, so as to provide a constant circulation of treatment solution and a continued re-use of it without slowing down or interrupting the in-line movement of the work pieces.

What I claim is:

1. In an integrated in-line process for substantially completely removing toxic material and waste carry-over from work pieces being chemically processed in a treatment line, the steps of preparing and maintaining a toxic material and waste neutralizing chemical solution; applying such solution directly to surfaces of the work pieces and to toxic material and waste carried-over by the work pieces from a toxic treatment zone, while moving the work pieces directly from the toxic treatment zone into and through a toxic material and waste removing zone; substantially completely chemically neutralizing and removing the toxic material and waste carry-over from the surfaces of the work pieces by applying the neutralizing solution thereto within the removing zone; constantly collecting, enriching and re-using the toxic material and waste neutralizing chemical solution, while advancing and treating the work pieces in the above-defined manner; moving the work pieces from the removing zone and only subsequently into and through a washing zone, and applying wash water in the washing zone to the surfaces of the work pieces and removing therefrom non-toxic carry-over from the toxic material and waste removing zone, so that the wash water will contain only innocuous material and may thus be directly discharged as sewage without stream contamination.

2. In a process as defined in claim 1 wherein, the thus-used wash water is discharged directly into a sewer and without stream contamination.

3. A process as defined in claim 1 wherein, a non-foaming wetting agent of a sulphonated fatty acid type is supplied to the toxic material and waste neutralizing chemical solution and is employed to quickly reach the surface portions of the work pieces when the neutralizing solution is being applied thereto.

4. A process as defined in claim 1 wherein, the neutralizing chemical solution is maintained as an aqueous solution containing water in excess of the quantity necessary to carry the neutralizing chemical content in solution.

5. A process as defined in claim 4 wherein, the quantity of neutralizing chemical carried in the neutralizing solution is maintained in excess of that required to neutralize the toxic material and waste carry-over within the removing zone.

6. In an integrated in-line process for substantially completely removing toxic material and waste carry-over from work pieces being chemically processed in a treatment line, the steps of preparing and maintaining a toxic material and waste neutralizing chemical solution; applying such solution directly to surfaces of the work pieces and to toxic material and waste carried over by the work pieces from a toxic treatment zone, while moving the work pieces directly from the toxic treatment zone into and through a toxic material and waste removing zone; substantially completely chemically neutralizing and removing the toxic material and waste carry-over from the surfaces of the work pieces by applying the neutralizing solution thereto within the removing zone; constantly collecting, enriching and re-using the neutralizing chemical solution, while advancing and treating the work pieces in the above-defined manner; moving the work pieces from the removing zone and only subsequently through a washing zone, and applying wash water in the washing zone to the surfaces of the work pieces and removing therefrom non-toxic carry-over from the toxic material and waste removing zone, so that the wash water will contain only innocuous material and may thus be directly discharged as sewage without stream contamination; the toxic material and waste neutralizing action being carried out in the removing zone by chemically converting the toxic material and waste carry-over, and then producing a non-toxic reaction product from the chemically converted material and waste carry-over, all before the wash water is applied to the surfaces of the work pieces.

7. A process as defined in claim 6 wherein, the toxic material and waste carry-over is of a cyanide type, the chemical conversion of the toxic material and waste carry-over and the provision of the non-toxic reaction product is accomplished by a neutralizing solution containing chlorine and an alkali metal hydroxide.

8. A process as defined in claim 7 wherein the neutralizing solution is maintained at a pH of about 8.5 to 11.

9. In an integrated process for substantially completely removing toxic material and waste carry-over from a work piece that has been chemically processed in a toxic treatment zone, wherein a toxic material and waste removing zone is positioned immediately following the toxic treatment zone and along a path of movement of the work piece, a reservoir containing a toxic material and waste neutralizing chemical solution is provided, and a washing water zone is positioned immediately following the removing zone and in the path of movement of the work piece; the method which comprises: applying the neutralizing solution from the reservoir to and substantially completely converting the toxic material and waste carried over by the work piece from the toxic treatment zone into non-toxic material in the removing zone, while moving the work piece in line from the toxic treatment zone and in a segregated relationship with respect thereto through the removing zone; returning used neutralizing solution from the removing zone to the reservoir; renewing the returned solution by supplying additional treating chemicals thereto; applying wash water to the work piece and to the non-toxic material carried over by it from the removing zone in the washing zone, while moving the work piece from the removing zone into and through the washing zone; substantially completely washing away non-toxic carry-over from the work piece in the wash zone, and maintaining the washing water innocuous, so that it may be directly discharged as sewage without stream contamination.

10. A process as defined in claim 9 which includes the steps of maintaining an excess of treating chemicals above that required for the neutralizing reaction in the removing zone to the treating solution, and maintaining the treating solution as an aqueous solution containing water in excess of the amount required to carry the chemicals in solution.

11. In an integrated in-line process for substantially completely removing toxic material and waste carry-over from work pieces being chemically processed in a treatment line, the steps of preparing and maintaining a toxic material and waste neutralizing solution; applying such solution directly to surfaces of the work pieces and to toxic material and waste carried over by the work pieces from a toxic treatment zone, while moving the work pieces in a segregated relationship with respect to the toxic treatment zone through a toxic material and waste removing zone; substantially completely neutralizing and removing the toxic material and waste carry-over from the surfaces of the work pieces within the removing zone; constantly collecting; enriching and re-using the toxic material and waste neutralizing solution, while advancing and treating the work pieces in the above-defined manner; subsequently, while moving the work pieces through a washing zone from the toxic material and waste removing zone, applying wash water to the surfaces of the work pieces and removing therefrom non-toxic carry-over from the toxic material and waste removing zone; the toxic material and waste carry-over being of a hexavalent type of chromium, and the toxic neutralizing action being carried out in substantially two steps as follows: first, reducing the hexavalent chromium material and waste carry-over with a treatment solution into trivalent chromium, and then precipitating trivalent chromium carry-over with a treatment solution, all before the wash water is applied to the surfaces of the work pieces.

12. A process as defined in claim 11 wherein the pH of the treatment solution employed in the first step is about 1.5 to 3.5, and the pH of the treatment solution employed in the second step is about 6.

13. A process as defined in claim 11 wherein used wash water is discharged directly into a sewer without stream contamination.

14. A process as defined in claim 11 wherein, sulphurous acid is employed in the first-mentioned treatment solution to reduce the hexavalent chromium material and waste carry-over, and an alkali metal hydroxide is employed in the second-mentioned treatment solution to precipitate the trivalent chromium as a salt.

15. A process as defined in claim 11 wherein a non-foaming wetting agent of a sulphonated fatty acid type is employed to reach the surfaces of the work pieces when the treatment solutions are being applied thereto.

16. In an integrated in-line process for substantially completely removing toxic material and waste carry-over from work pieces being chemically processed in a treatment line, the steps of preparing and maintaining a toxic material and waste neutralizing chemical solution; applying such solution directly to surfaces of the work pieces and to toxic material and waste carried over by the work pieces from a toxic treatment zone, while moving the work pieces directly from the toxic treatment zone into and through a toxic material and waste removing zone; substantially completely chemically neutralizing and removing the toxic material and waste carry-over from the surfaces of the work pieces by applying the neutralizing solution thereto within the removing zone; maintaining an excess of neutralizing chemical in the neutralizing solution; and providing an innocuous carry-over from the removing zone on the surfaces of the work pieces, so that wash water applied thereto will contain only innocuous material.

References Cited in the file of this patent

UNITED STATES PATENTS

| 1,392,780 | Marsh | Oct. 4, 1921 |
| 1,951,712 | Schoeller | Mar. 20, 1934 |
| 1,980,342 | Kern | Nov. 13, 1934 |
| 2,249,792 | Skinner | July 22, 1941 |
| 2,322,417 | Christian | June 22, 1943 |
| 2,325,158 | Wood | July 27, 1943 |
| 2,529,762 | Brisse | Nov. 14, 1950 |
| 2,541,901 | Zademach | Feb. 13, 1951 |
| 2,692,188 | Chester | Oct. 19, 1954 |